No. 618,544. Patented Jan. 31, 1899.
C. MAUL.
BEET HARVESTING MACHINE.
(Application filed Feb. 7, 1898.)
(No Model.)  2 Sheets—Sheet 1.
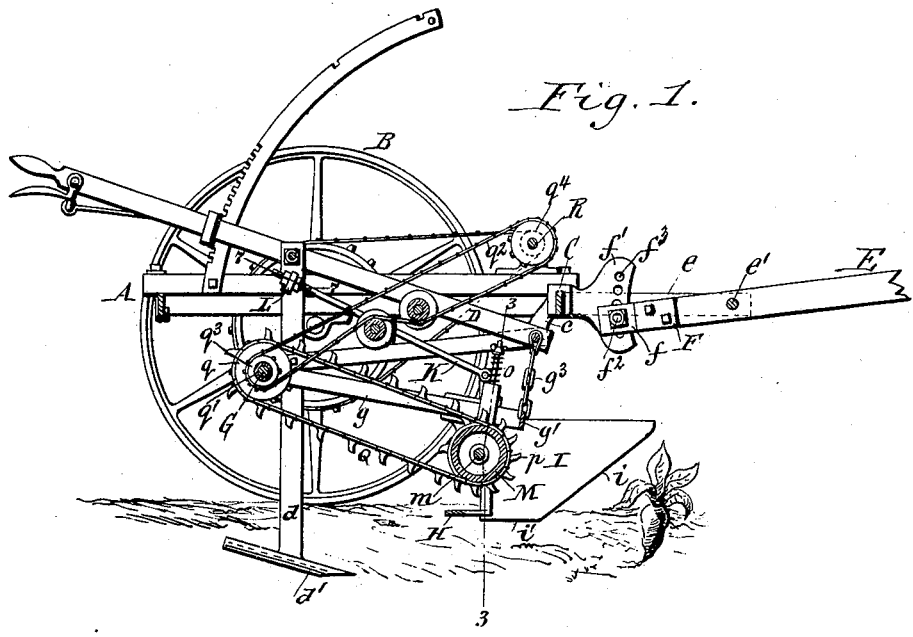
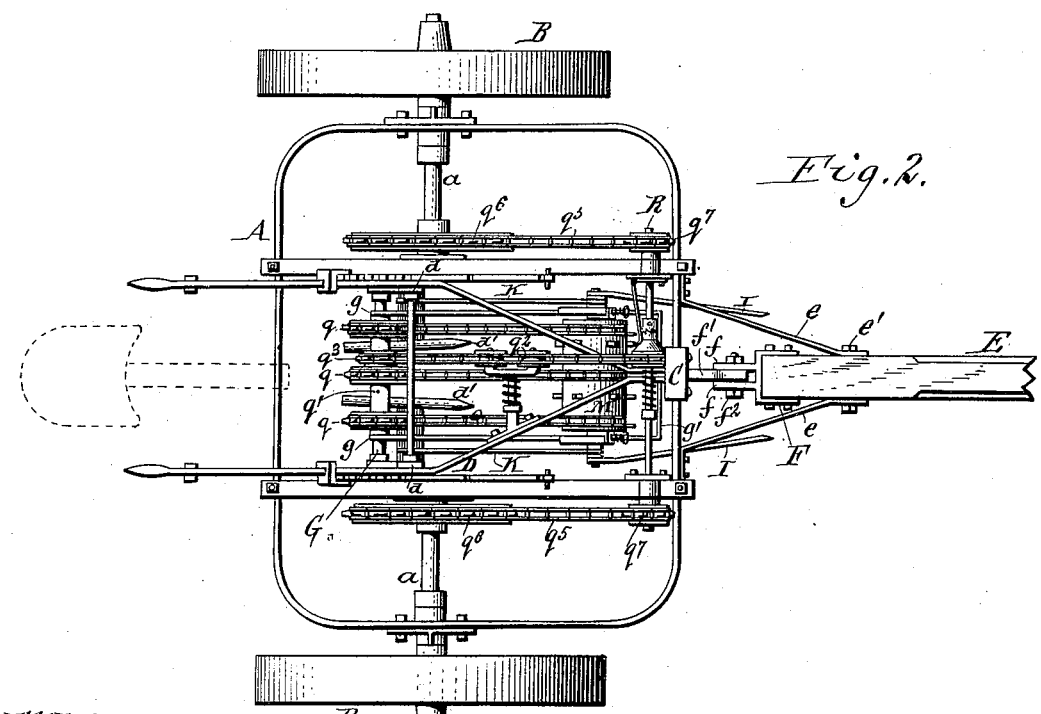
Witnesses:
Chas. F. Burkhart
Henry L. Deck
Christian Maul, Inventor.
By Wilhelm & Bonner
Attorneys
THE NORRIS PETERS CO., PHOTO-LITHO., WASHINGTON, D. C.

No. 618,544. Patented Jan. 31, 1899.
C. MAUL.
BEET HARVESTING MACHINE.
(Application filed Feb. 7, 1898.)
(No Model.) 2 Sheets—Sheet 2.
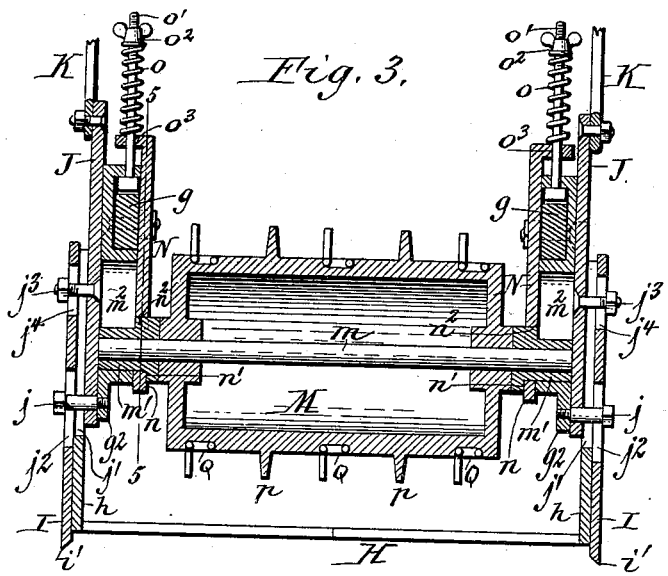
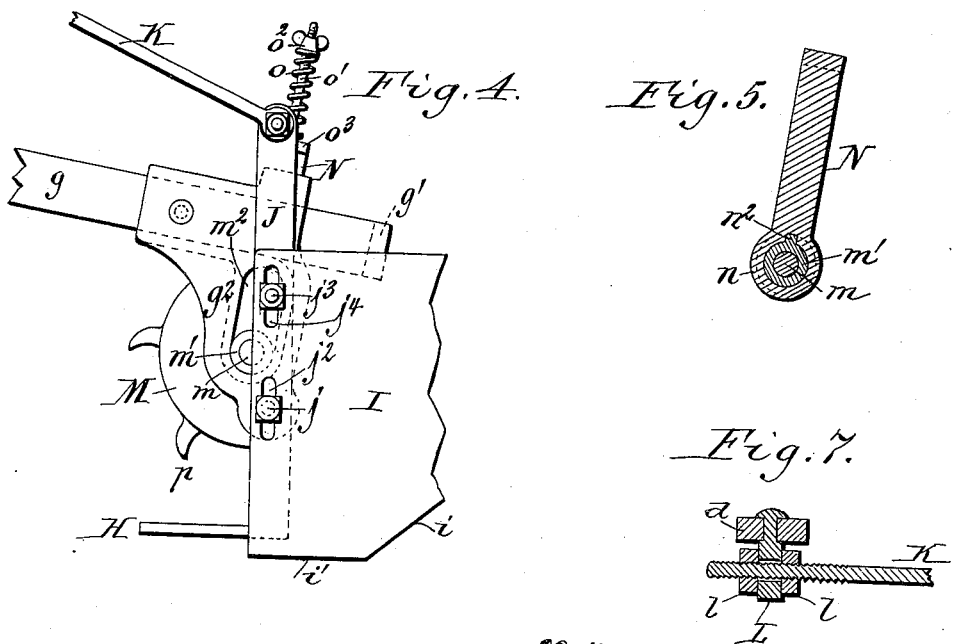
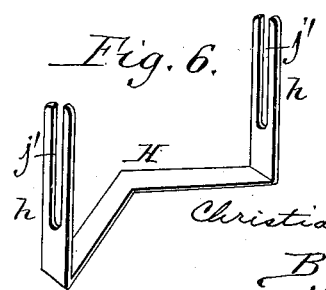
Witnesses: Chas. F. Burkhart, Henry L. Deck.
Christian Maul, Inventor.
By Wilhelm Bonner, Attorneys.

UNITED STATES PATENT OFFICE.

CHRISTIAN MAUL, OF BATAVIA, NEW YORK, ASSIGNOR TO THE JOHNSTON HARVESTER COMPANY, OF SAME PLACE.

BEET-HARVESTING MACHINE.

SPECIFICATION forming part of Letters Patent No. 618,544, dated January 31, 1899.

Application filed February 7, 1898. Serial No. 669,433. (No model.)

*To all whom it may concern:*

Be it known that I, CHRISTIAN MAUL, a citizen of the United States, residing at Batavia, in the county of Genesee and State of New York, have invented a new and useful Improvement in Beet-Harvesting Machines, of which the following is a specification.

This invention relates to a machine for cutting off the tops of beets, turnips, and similar vegetables and then digging the same out of the ground. Machines of this kind contain, among other instrumentalities, a cutter by which the tops of the beets are cut off, a gage-roller which controls the position of the cutter with reference to the tops of the beets and insures the cutting of the tops at a uniform height, and diggers by which the beets are dug out of the ground after the tops have been cut off. In the operation of these machines it is important that the cutter should remain in a substantially horizontal position as it moves up and down with the frame in which it is mounted, since when the cutter inclines forwardly it is liable to split the beets and when it inclines backwardly it is liable to press the beets down. It is also important that the gage-roller should be capable of yielding in passing over stones and other obstructions.

The objects of my invention are to provide means for adjusting the angle of the diggers to suit the height at which the machine is hitched to the horses, to provide means whereby the cutter is retained in a horizontal position, or nearly so, for properly cutting the tops off the beets, and to provide a yielding connection between the cutter and gage-roller.

In the accompanying drawings, consisting of two sheets, Figure 1 is a longitudinal sectional elevation of my improved beet-harvesting machine. Fig. 2 is a top plan view of the same. Fig. 3 is a vertical transverse section, on an enlarged scale, in line 3 3, Fig. 1. Fig. 4 is a fragmentary side elevation of the cutter mechanism on the same scale as Fig. 3. Fig. 5 is a vertical section in line 5 5, Fig. 3. Fig. 6 is a perspective view of the horizontal cutter and its supporting-arms. Fig. 7 is a horizontal section, on an enlarged scale, in line 7 7, Fig. 1.

Like letters of reference refer to like parts in the several figures.

A represents the main frame of the machine, $a\ a$ the axles journaled transversely on opposite sides of the frame, and B B the ground-wheels arranged on the axles.

C represents a clip or saddle secured centrally to the front portion of the main frame and provided on its rear side with depending ears or hangers $c$.

D represents the vertically-adjustable digger-frame, pivoted at its front end to the hangers $c$ and provided with two upright digger-bars $d\ d$, each of which is provided at its lower end with a digger tool or plow $d'$, whereby the beets are dug out of the ground.

E represents the draft-pole, which is adjustably connected with the main frame, so that the latter can be tilted with reference to the pole until the plows or diggers stand at the proper angle.

$e\ e$ represent two draft-arms projecting forwardly from the main frame and connected by a transverse pivot $e'$ to the pole in front of the rear end of the latter. The rear end of the pole is provided with a head F, having two rearwardly-projecting ears $f\ f$, which embrace a segment $f'$, arranged on the front portion of the frame, and which are secured to the segment by a bolt $f^2$, passing through the ears and through one of a row of openings $f^3$ in the segment. By adjusting the rear end of the pole up or down on the segment the main frame and digger-frame, together with the digger-plows, are depressed or raised with reference to the pole until the plows stand at the angle in which they dig the beets most effectively. By this means the diggers can always be adjusted to the proper position regardless of whether the pole is hitched high or low on the horses.

The cutter-frame which supports the cutter mechanism consists of two longitudinal side bars $g\ g$, a cross-bar $g'$, connecting the front ends of the side bars, and two hangers $g^2\ g^2$, depending from the front portions of the side bars. The rear ends of the side bars of the cutter-frame are hung on a transverse bar G, which connects the central portions of the digger-bars, and the cross-bar of the cutter-frame is connected by a chain $g^3$ with the pivot on the hangers $c$, so as to limit the downward movement of the cutter-frame.

H represents the horizontal or main cutter whereby the tops of the beets are cut off. This cutter has preferably the usual form of a transverse V-shaped bar or plate, as shown in Fig. 6, and is provided at its ends with upwardly-extending supporting-arms $h\ h$.

I I represent two vertical side cutters whereby those portions of the leaves which project laterally beyond the horizontal cutter are cut off and prevented from passing backward over the horizontal cutter with the beet-tops. These side cutters extend forwardly from the arms of the horizontal cutter, and each side cutter is provided with an inclined cutting edge $i$, which extends rearwardly and downwardly from the front end of the cutter, and a horizontal cutting edge $i'$, which extends rearwardly from the lower end of the inclined edge.

The devices whereby the main cutter H is retained in a horizontal position, or nearly so, are constructed as follows:

J J represent two upright rock-arms arranged outside of the cutter-frame and pivoted with their lower ends to the hangers of the cutter-frame by transverse bolts $j\ j$, Figs. 3 and 4. The supporting-arms of the horizontal cutter bear against the outer sides of the rock-arms J and the rear ends of the side cutters bear against the outer sides of these supporting-arms. The pivot of each rock-arm passes through a vertical slot $j'$ in the adjacent supporting-arm $h$ of the horizontal cutter and through a vertical slot $j^2$ in the adjacent side cutter, and each of the arms $j$ and the adjacent side cutter are secured to one of the rock-arms by a clamping-bolt $j^3$, passing through the slot $j'$ in the cutter-arm and a slot $j^4$ in the rear portion of the side cutter. By this means the side cutters and the main cutter are rigidly secured to the rock-arms J, so that they are controlled in this position by these rock-arms. By swinging the latter backwardly on the pivots $j$ the front edge of the main cutter is raised and by swinging them forwardly it is lowered. The side cutters are secured to these rock-arm mainly as a matter of convenience and to simplify the construction, as there is no necessity of controlling their position by the rock-arms. By means of the slots in the side cutter and in the arms of the horizontal cutters the cutters can be adjusted vertically on the rock-arms to suit the condition of the beets and to take up wear.

The position of the rock-arms is controlled by two longitudinal shifting bars or rods K, which are pivoted at their front ends to the upper ends of the rock-arms and are pivotally connected at their rear ends with the upper portions of the digger-bars or other suitable parts of the framework of the machine. As the cutter-frame rises and falls in passing over the uneven surface of the ground the main cutter is tilted on the pivots $j$ by the rods K and rock-arms J in such manner that the horizontal position of the cutter is substantially maintained. This enables the cutter to always cut horizontally across the beets, thereby severing the top nicely from the body of the beet. The pivotal connection at the rear end of each shifting rod or bar consists of a swivel-eye L, which receives the screw-threaded rear end of the shifting rod and is pivoted to the digger-bar, and two clamping-nuts $l$, applied to the shifting rod on opposite sides of the swivel-eye, as shown in Figs. 1 and 7. By shifting the clamping-nuts on the rod the normal position of the cutters may be adjusted.

The side cutters preferably converge forwardly in order to deflect the severed leaves laterally and prevent the same from passing over the horizontal cutter and clogging the same.

M represents the gage wheel or roller, which is arranged over the horizontal cutter and rolls over the tops of the beets for regulating the depth at which the tops of the beets are cut off from the body by the horizontal cutter. This roller is mounted on a transverse shaft $m$, which is journaled with its ends in vertically-movable bearings $m'$. These bearings are cylindrical in form, and each bearing is guided in a vertical slot $m^2$, formed in the adjacent hanger of the cutter-frame.

N N represent presser-bars arranged on the inner side of the longitudinal bars $g$ of the cutter-frame and each provided at its lower end with an opening or eye $n$, which receives the adjacent bearing of the gage-roller shaft. Each of the bearings is held against outward movement in the presser-bar by a shoulder $n'$, arranged on the bearing on the inner side of the bar, and the bearing is held against turning in the eye of the bar by a lug $n^2$, arranged on the bearing and engaging with a notch in the eye of the bar, as shown in Figs. 3 and 5.

O O represent springs whereby the gage-roller is yieldingly held in its depressed position. Each of these springs surrounds a vertical guide-rod $o'$ and bears with its upper end against an adjusting-screw $o^2$ on said rod, while its lower end bears against an ear $o^3$ on the upper end of the presser-bar. This ear is guided on the lower portion of the guide-rod and the lower end of the latter is secured to the adjacent hanger of the cutter-frame. As the gage-roller rises and falls in rolling over the beets the horizontal cutter rises and falls with the roller, engages with the beets at a definite distance from the top, and severs the tops of the beets uniformly from the bodies thereof. If a stone or other hard substance greater than the normal space between the horizontal cutter and the gage-roller passes between these parts, the latter yields upwardly and permits such substance to pass, thereby avoiding clogging of the cutters.

As usual, the gage-roller is provided on its periphery with teeth $p$, which carry the leaves and beet-tops backward over the horizontal cutter. The leaves and beet-tops are controlled between the cutters and the diggers by a number of toothed clearer-belts Q, which pass with their front portions around the gage-roller, while their rear portions pass around sprocket-wheels $q$, arranged on a hollow transverse shaft $q'$. The latter turns on the rod G and is rotated by a chain belt $q^2$, passing around a sprocket-wheel $q^3$ on the shaft $q'$ and a sprocket-wheel $q^4$ on a counter-shaft R, and chain belts $q^5 q^5$, passing around sprocket-wheels $q^6 q^7$, arranged on the axles and the counter-shaft, respectively.

I claim as my invention—

1. The combination with the machine-frame and the vertically-movable cutter-frame, of a horizontal cutter pivoted to the cutter-frame, and a shifting mechanism which connects said cutter with the machine-frame and retains the cutter in a substantially horizontal position as it rises and falls with the cutter-frame, substantially as set forth.

2. The combination with the machine-frame and the vertically-movable cutter-frame, of a horizontal cutter, rock-arms which are pivoted to the cutter-frame and to which the cutter is secured, and shifting rods connecting said rock-arms with the machine-frame, substantially as set forth.

3. The combination with the machine-frame and the cutter-frame hung at its rear end to the machine-frame and capable of vertical movement at its front end, of a horizontal cutter, rock-arms which are pivoted to the cutter-frame and to which the cutter is secured, shifting rods connecting said rock-arms with the machine-frame, and a gage-roller mounted in the cutter-frame above said cutter, substantially as set forth.

4. The combination with the machine-frame and the vertically-movable cutter-frame, of rock-arms pivoted to the cutter-frame, a horizontal cutter and two longitudinal side cutters secured to said rock-arms, and shifting rods connecting said rock-arms with the machine-frame, substantially as set forth.

5. The combination with the cutter-frame, of a horizontal cutter connected with the cutter-frame, and two vertical cutters arranged longitudinally on opposite sides of the horizontal cutter, each of said vertical cutters being provided with an inclined cutting edge which extends rearwardly and downwardly from its front end, substantially as set forth.

6. The combination with the cutter-frame and the horizontal cutter mounted therein, of a gage arranged above said cutter and means whereby the gage is held yieldingly in its depressed position, substantially as set forth.

7. The combination with the cutter-frame and the horizontal cutter connected therewith, of a gage arranged above the cutter and vertical guideways on the cutter-frame in which the gage can move up and down, substantially as set forth.

8. The combination with the cutter-frame and the horizontal cutter connected therewith, of a gage-roller arranged above the cutter, vertically-movable bearings which are guided in ways on the cutter-frame and in which the gage-roller is journaled, presser-bars connected with said bearings, guide-rods connected with the cutter-frame, and springs interposed between the presser-bars and the guide-rods and serving to hold the gage-roller in a depressed position, substantially as set forth.

Witness my hand this 18th day of January, 1897.

CHRISTIAN MAUL.

Witnesses:
GEORGE O. VOLZ,
GEO. C. FARRALL.